(12) United States Patent
Kimijima et al.

(10) Patent No.: US 11,743,601 B2
(45) Date of Patent: Aug. 29, 2023

(54) IMAGE PROCESSING DEVICE, IMAGE PROCESSING METHOD, AND STORAGE MEDIUM

(71) Applicant: CANON KABUSHIKI KAISHA, Tokyo (JP)

(72) Inventors: Yuichirou Kimijima, Kanagawa (JP); Kazunori Takayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 147 days.

(21) Appl. No.: 17/127,522

(22) Filed: Dec. 18, 2020

(65) Prior Publication Data

US 2021/0195101 A1   Jun. 24, 2021

(30) Foreign Application Priority Data

Dec. 24, 2019  (JP) .................................. 2019-232534

(51) Int. Cl.
| | |
|---|---|
| *H04N 23/951* | (2023.01) |
| *G03B 7/093* | (2021.01) |
| *H04N 5/14* | (2006.01) |
| *H04N 23/61* | (2023.01) |

(52) U.S. Cl.
CPC ........... *H04N 23/951* (2023.01); *G03B 7/093* (2013.01); *H04N 5/144* (2013.01); *H04N 23/61* (2023.01)

(58) Field of Classification Search
CPC .... G03B 7/093; H04N 5/144; H04N 5/23218; H04N 5/23219; H04N 5/23232; H04N 5/23254; H04N 5/23267; H04N 5/232935
See application file for complete search history.

(56) References Cited

U.S. PATENT DOCUMENTS

| | | | |
|---|---|---|---|
| 9,143,670 B1* | 9/2015 | Cilia | H04N 23/66 |
| 2012/0106869 A1* | 5/2012 | Machitani | H04N 23/6811 |
| | | | 382/284 |
| 2016/0080633 A1* | 3/2016 | Hong | H04N 23/611 |
| | | | 348/169 |
| 2017/0006228 A1* | 1/2017 | Takayanagi | H04N 23/6815 |
| 2017/0076156 A1* | 3/2017 | Borel | G11B 27/031 |
| 2018/0270420 A1* | 9/2018 | Lee | H04N 23/69 |
| 2020/0092463 A1* | 3/2020 | Wang | G06V 10/82 |
| 2020/0106952 A1* | 4/2020 | Missig | H04N 7/141 |
| 2021/0084231 A1* | 3/2021 | Lee | G06F 3/0412 |

FOREIGN PATENT DOCUMENTS

JP         2018014659 A         1/2018

* cited by examiner

*Primary Examiner* — Amy R Hsu
(74) *Attorney, Agent, or Firm* — Canon U.S.A., Inc. IP Division

(57) ABSTRACT

In order to obtain an image processing device capable of performing imaging processing appropriately using object information, the image processing device includes an imaging unit which is capable of selectively acquiring an image for live view and a still image, a drive control unit which acquires the still image through a predetermined operation when the image for live view is periodically acquired at a predetermined first period, and acquires an image for live view again immediately after the still image is acquired, an object detecting unit which detects object information from an image for live view immediately before or immediately after the still image is acquired, and a signal processing unit which processes the still image on the basis of the object information detected by the object detecting unit.

8 Claims, 10 Drawing Sheets

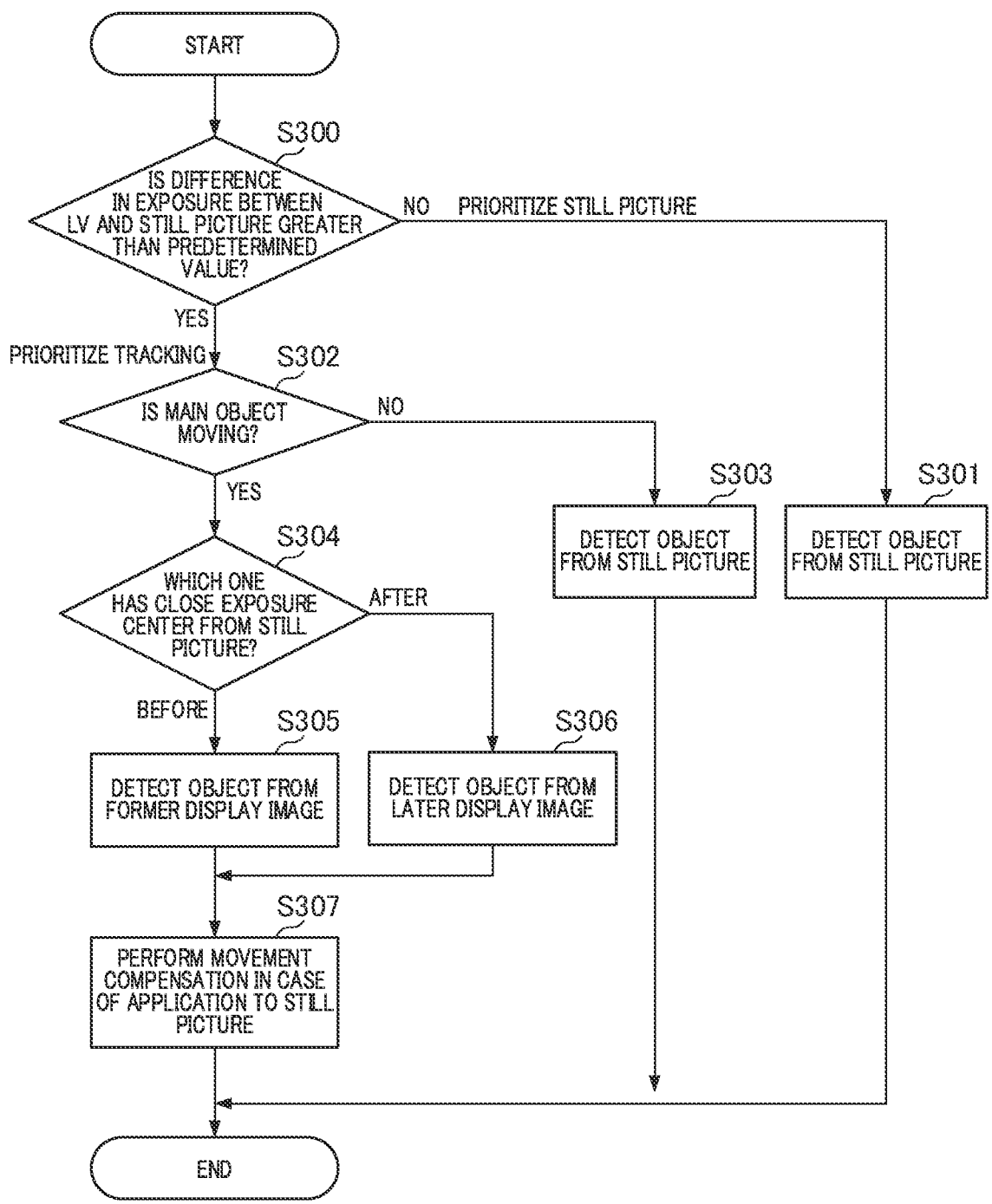

IMAGE PROCESSING DEVICE, IMAGE PROCESSING METHOD, AND STORAGE MEDIUM

BACKGROUND

Field

The present disclosure relates to an image processing device using object information, and the like.

Description of the Related Art

Hitherto, in an image processing device such as a digital camera, it has been possible to perform framing of an object even during continuous shooting of still pictures, and thus an image for live view (LV) has been captured in a gap period of continuous shooting of still pictures.

On the other hand, an operation of detecting an object from an image is required not only to track an object in an LV image but also to generate various parameters at the time of processing a still picture signal. Thus, an object is detected from an image captured for LV during framing, and an object is detected from a still image captured for recording of a still picture at the time of developing a still picture.

Here, when an object is detected, proper exposure differs between an image for LV and a still image for a still picture, and thus erroneous detection may occur due to a difference between object information detected from the image for LV and object information detected from the still image for a still picture.

On the other hand, in Japanese Unexamined Patent Application Publication No. 2018-14659, in a case where more than a predetermined amount of change in exposure occurs, an erroneous detection is avoided by not using object information detected from a still image for a still picture.

On the other hand, with an increase in a frame rate of a display rate of a moving image and an increase in a continuous shooting speed of still pictures in recent years, there is a possibility that a processing time for detecting an object will not fall within a predetermined period of time when an object is detected from each of an image for LV and a still picture. Further, in recent years, processing has become complicated due to introduction of AI technology and the like, and a long processing time has also been required in object detection using image recognition. On the other hand, when high-speed processing using dedicated hardware is attempted, problems of cost and power consumption occur.

In addition, a processing time for object detection increases or decreases in accordance with the number of objects, the degree of difficulty in image recognition, and the like. Thus, for example, in a case where an object is detected from an image for LV and a processing time for object detection is long, a period of time for detecting an object from a still image for a still picture is insufficient, which may exert an adverse effect on developing processing of a still picture.

In contrast, in a case where a processing time for detecting an object from a still image captured for a still picture is increased, an object cannot be detected from an image for LV, and thus there is a possibility that tracking of an object will not be successful in a configuration disclosed in Japanese Unexamined Patent Application Publication No. 2018-14659. There is a need in the art to provide an image processing device which is capable of processing an image appropriately using object information.

SUMMARY

In order to achieve the object, an image processing device according to an aspect of the present disclosure includes at least one processor or circuit configured to function as: an imaging unit which is capable of selectively acquiring an image for live view and a still image, a drive control unit which acquires the still image through a predetermined operation when the image for live view is periodically acquired at a predetermined first period, and acquires an image for live view again immediately after the still image is acquired, an object detecting unit which detects object information from an image for live view immediately before or immediately after the still image is acquired, and a signal processing unit which processes the still image on the basis of the object information detected by the object detecting unit.

Further features of the present disclosure will become apparent from the following description of embodiments with reference to the attached drawings.

BRIEF DESCRIPTION OF THE DRAWINGS

FIG. 10 is a flowchart illustrating a control flow for an object position detection unit 107 in Embodiment 3.

DESCRIPTION OF THE EMBODIMENTS

Figure 1:
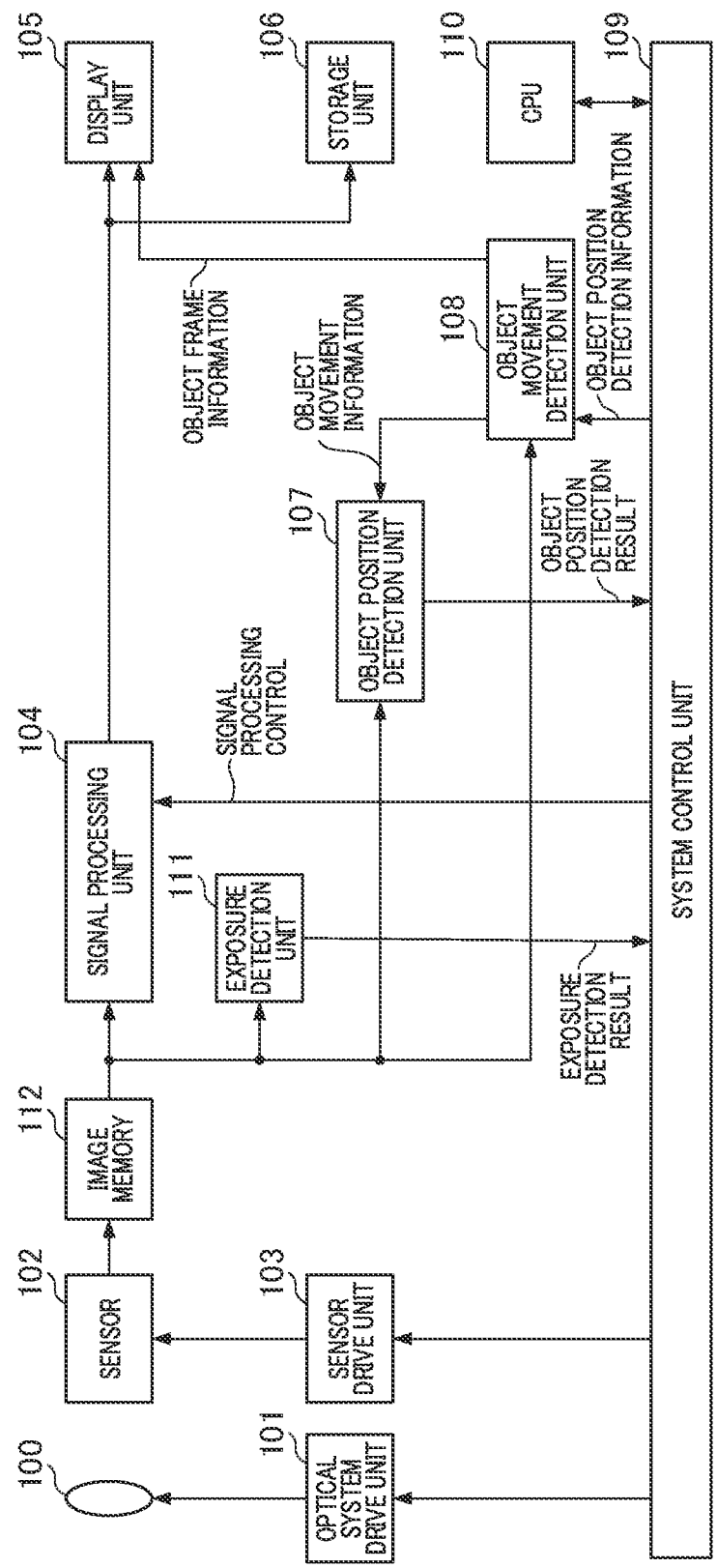
FIG. 1 is a block diagram of an image processing device in Embodiment 1 of the present disclosure.

Hereinafter, a preferred embodiment of the present disclosure will be described using Embodiments with reference to the accompanying drawings. Meanwhile, in the drawings, the same members or components will be denoted by the same reference numerals and signs, and repeated description will be omitted or simplified. Further, in the Embodiments, an example in which the present disclosure is applied to an imaging device such as a digital still camera as an image processing device will be described. However, the image processing devices in the present Embodiments include image processing devices having an imaging function such as a digital movie camera, a smartphone with a camera, a tablet computer with a camera, an on-vehicle camera, and a network camera.

Embodiment 1

Embodiment 1 of the present disclosure will be described below using the drawings. FIG. 1 is a block diagram illustrating an example of a configuration of a digital camera according to Embodiment 1, 100 denotes a lens of an optical system, and 101 denotes an optical system drive unit that drives an adjustment mechanism such as a diaphragm or a focus for controlling light incident on an imaging unit. 102 denotes a sensor that receives light from an object through an optical system and outputs image data, and is, for example, a CMOS type image sensor. The sensor 102 is an imaging unit that can selectively acquire an image for live view (LV) and a still image for recording a still picture.

103 denotes a sensor drive unit that controls a drive method for a sensor according to a mode (a moving image mode, a still picture mode, or the like) of a digital camera, and 112 is an image memory such as a DRAM that temporarily stores image data output from a sensor. 104 denotes a signal processing unit that generates data used for displaying or recording on the basis of image data which is output from a sensor and obtained through an image memory.

The signal processing unit 104 executes a plurality of processes such as pixel correction, black level correction, shading correction, defect correction, white balance adjustment, magnification chromatic aberration correction, gamma correction, luminance and color generation processing, geometric deformation correction, noise reduction, and image magnification and reduction. 105 denotes a display unit that includes a display device, is connected to the signal processing unit 104, and performs processing such as resizing corresponding to the size of a display device not shown in the drawing. Further, the display unit 105 generates an on-screen display (OSD) image superimposed on display image data and displays, for example, object frame information on a display image of a display device in an overlapping manner.

106 denotes a recording unit which is connected to the signal processing unit 104 and records still picture data or moving image data in a detachable storage medium such as an SD card not shown in the drawing. 107 denotes an object position detection unit that detects a main object region in an image from image data which is input from the sensor 102 through, for example, image recognition. 108 denotes an object movement detection unit that detects the amount and direction of movement of an object on the basis of image data input from the sensor 102 and a plurality of object position detection results obtained from the object position detection unit 107, and generates object frame information. An object detecting unit is constituted by the object position detection unit 107 and the object movement detection unit 108.

The object frame information generated by the object movement detection unit 108 is supplied to the display unit 105, and a mark such as frame data of an object is generated. In addition, the object movement detection unit 108 supplies object movement information as reference information for detecting the position of an object to the object position detection unit 107. 109 denotes a system control unit that acquires object information such as the above-described object position detection results and outputs a control instruction to the optical system drive unit 101, the sensor drive unit 103, or the like. 110 denotes a central processing unit (CPU) which is a computer that performs processing such as generation of a drive signal or the like while communicating with the system control unit 109 on the basis of detection results obtained from detection units through the system control unit 109.

In addition, the CPU 110 functions as a control means for executing various operations of the entire device together with the system control unit 109 on the basis of computer programs stored in a memory not shown in the drawing. 111 denotes an exposure detection unit that detects exposure information (brightness information) of an object from image data which is output from the sensor 102. The detected object exposure information is supplied to the system control unit 109. The system control unit 109 controls a diaphragm using the optical system drive unit 101 on the basis of the object exposure information, and controls parameters of various types of signal processing of the signal processing unit 104.

Meanwhile, in recent digital cameras, the speed of a frame rate of LV is increased, and a continuous shooting speed (the number of captured frames of a still picture capable of being captured (acquired) per second) is also increased. Thus, it is difficult to continuously acquire detection results from frames of each of live view and a still picture at all times. Consequently, it is conceivable to execute a process of detecting an object from LV at a low frame rate of imaging, for example, by executing the process every several frames.

Figure 2:
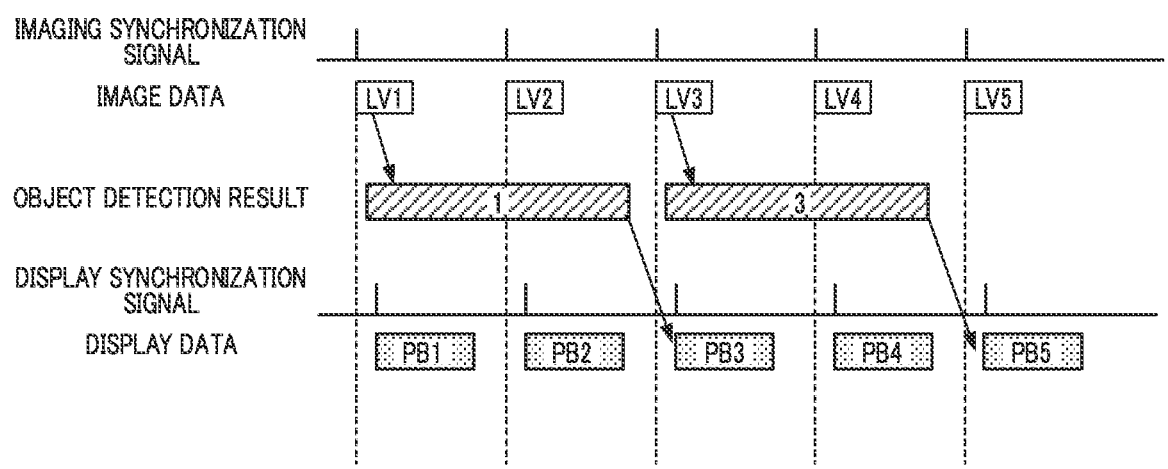
FIG. 2 is a timing chart illustrating object detection in the case of high-speed LV in Embodiment 1.

FIG. 2 illustrates capture (acquisition) and display of an image for live view and a timing chart for obtaining detection results at that time in Embodiment 1 (the horizontal axis represents time). A synchronization signal for imaging is a synchronization signal in units of frames which is output from the sensor drive unit 103 to the sensor 102. Similarly, a synchronization signal for display is a synchronization signal in units of frames with respect to a display device not shown in the drawing. An image signal (display data) and object frame data acquired from the signal processing unit 104 are displayed on the display unit 105 in an overlapping manner while being synchronized with synchronization signals thereof.

LV1 to LV5 indicate LV image data, and PB1 to PB5 indicate display data. In FIG. 2, a frame rate of imaging (image capture) and a frame rate of display are, for example, 120 fps, and 120 frames are consecutively imaged per second, which leads to high-speed LV display. When detection processing through image recognition of an object or the like performed at that time is performed at high-speed frame rates of imaging and display, a large load is generated. For this reason, in FIG. 2, the object position detection unit 107 detects an object at a cycle of half the frame rate of imaging, and detected results (object frame data) are reflected in display data two frames after the detected frame.

Meanwhile, the object detection (detection of object information) mentioned herein includes, for example, detection of the object's face, detection of the object's pupils, detection of the shape and posture of the full body, and detection of the object's head through image recognition. Based on object information that is the result of the object detection, for example, automatic object tracking in LV display and various correction processing in LV display and still picture developing processing are performed. Examples of the correction processing include generation of a facial effect which is performed by weakening contour emphasis of a face part of an object in a still picture, an increase in a resolution through a decrease in a compression rate of an object part, correction of the skin color of a face part of an object, white balance correction according to the skin color of a face, and the like.

That is, in FIG. 2, results detected from a frame denoted by LV1 are reflected in display data denoted by PB3. Ideally, it is preferable that an object detection result obtained from imaging data denoted by LV1 be reflected in display data denoted by PB1. However, in the case of a frame rate of approximately 120 fps, even when a frame having an object detection result reflected therein is two or three frames later, a delay in object detection does not have a significant effect on the accuracy of autofocus.

Figure 3:
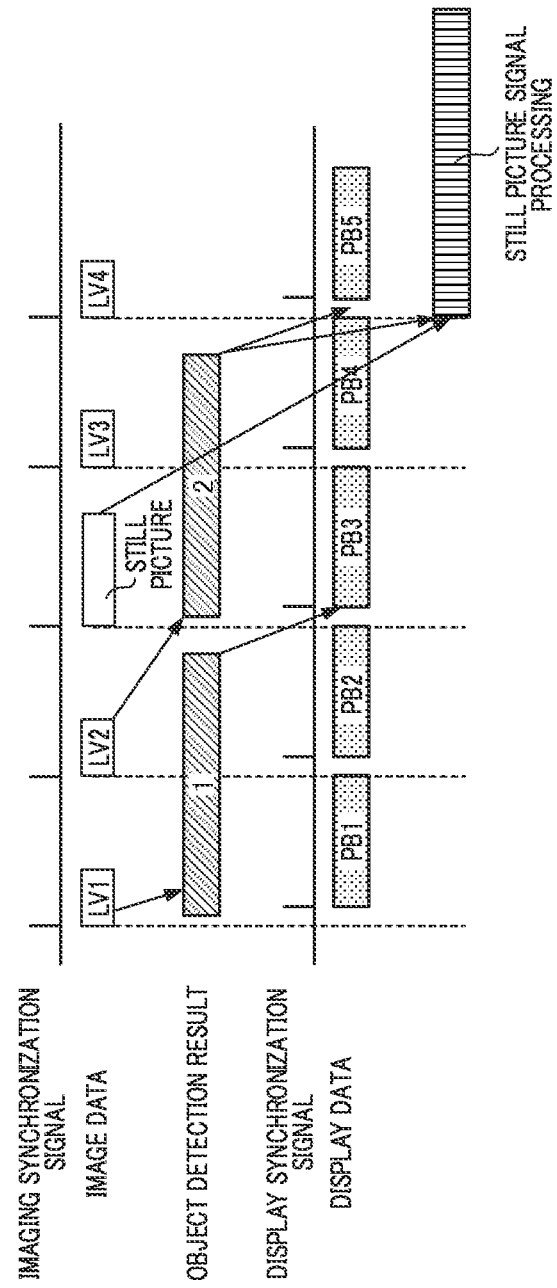
FIG. 3 is a timing chart illustrating an example in a case where a still picture is captured during high-speed LV in Embodiment 1.

FIG. 3 is a diagram illustrating an example of a timing chart in a case where a still picture is captured during high-speed LV display with respect to FIG. 2, and illustrates a case where a still picture is captured at a timing denoted by LV3 in FIG. 2 (the horizontal axis represents time). In FIG. 2, when an image for live view is periodically acquired at a first period, drive control is performed to acquire a still image by operating a predetermined shutter release button and acquire an image for live view again immediately after the still image is acquired.

In FIG. 2, an object is detected from imaging data of LV3, and detection results (frame data and the like) are reflected in a frame denoted by PB5. However, since LV3 is not present in FIG. 3, it is conceivable to detect an object from a still picture or acquire an object from LV2. However, in a case where an object is detected from a still picture, a still image may be improperly exposed in a case where a user manually sets exposure, or the like, and thus an object detection result may not be obtained correctly.

Accordingly, in the example of FIG. 3, an object is detected from LV2 without being detected from a still picture, and detection results are reflected in a display frame of PB5. In addition, when signal processing of a still picture is performed, object detection is performed on the basis of an image obtained at a timing of LV2, and the signal processing unit 104 performs signal processing of a still picture using an object detection result. That is, as described above, processing such as generation of a facial effect which is performed by weakening contour emphasis of a face part of an object in a still picture, an increase in a resolution through a decrease in a compression rate of an object part, correction of the skin color of a face part of an object, or white balance correction according to a face part is performed using an object detection result.

Figure 4:
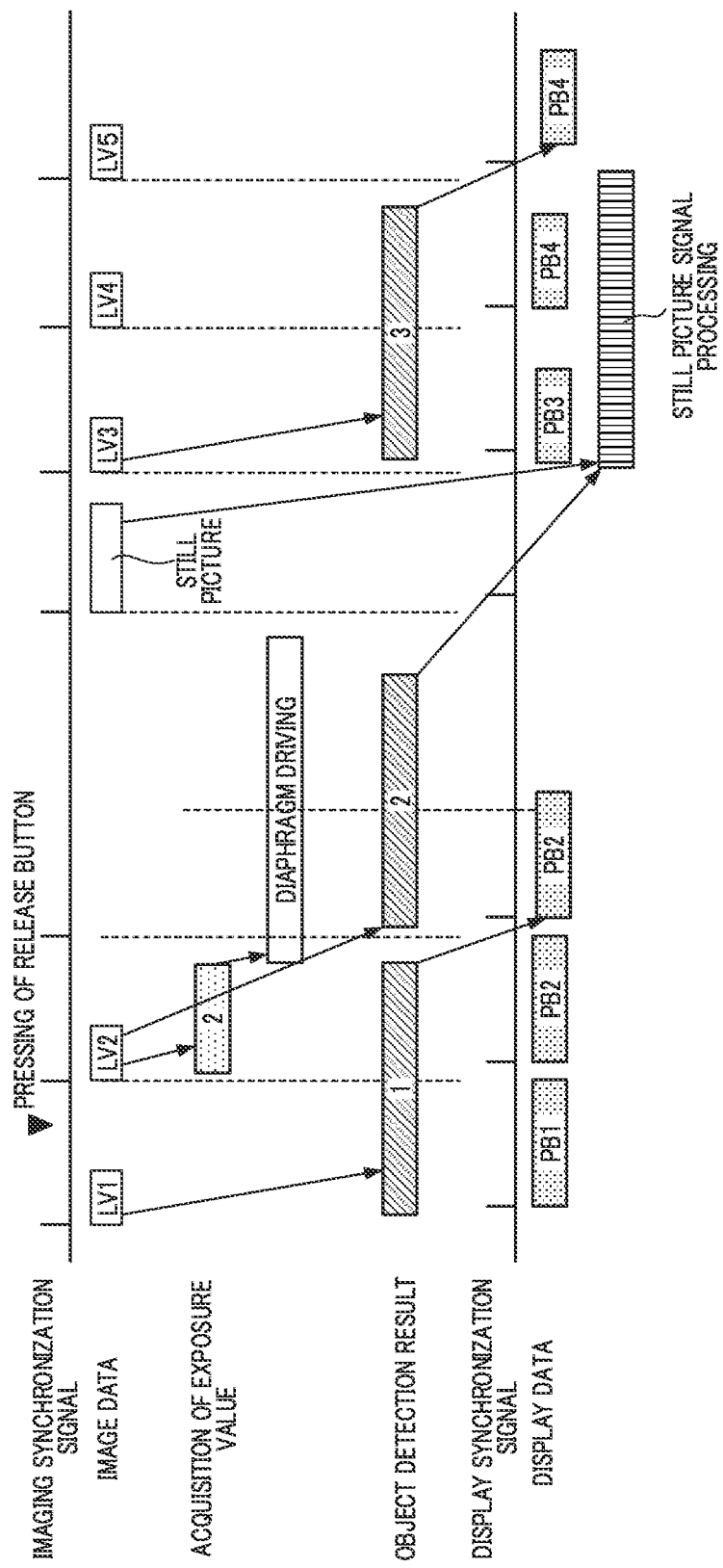
FIG. 4 is a timing chart illustrating an example in a case where a still picture is captured during high-speed LV in Embodiment 1 and a diaphragm is driven.

FIG. 4 is a timing chart illustrating a case where diaphragm drive occurs when a still picture is captured during high-speed LV in Embodiment 1. In FIG. 4, the exposure detection unit 111 acquires an exposure value (the value of brightness of an object) from an LV image immediately after a user presses a shutter release button, with respect to the example of FIG. 3. In addition, the system control unit 109 calculates the amount of diaphragm drive on the basis of the acquired exposure value, and the optical system drive unit 101 performs diaphragm drive for capturing a still picture in accordance with the amount of diaphragm drive (the horizontal axis represents time).

The shutter release button is pressed at a timing immediately before LV2, and the exposure detection unit 111 detects exposure using an image of LV2 immediately after the pressing. The CPU 110 performs computation using exposure detection results, and the optical system drive unit 101 controls the diaphragm of a camera on the basis of the computation results. In this case, although it depends on operation conditions of the diaphragm and the like, it may take several tens of ms to appropriately control the diaphragm, and since exposure fluctuates during the operation of the diaphragm, it is not possible to obtain appropriate imaging data.

In the timing chart of FIG. 3, signal processing of a still picture is performed using detection results of image data LV2 for LV immediately before a still picture that is an object detection result for a still image. However, in the case of FIG. 4, since timings of LV2 and capture of a still picture are separated from each other, there is a possibility that object deviation will occur in a still image and an image of LV2. Furthermore, since an exposure value at a point in time of LV2 and an exposure value of a still picture are different from each other, there is a possibility that the reliability of an object detection result based on an image obtained by LV2 will be reduced.

Figure 5:
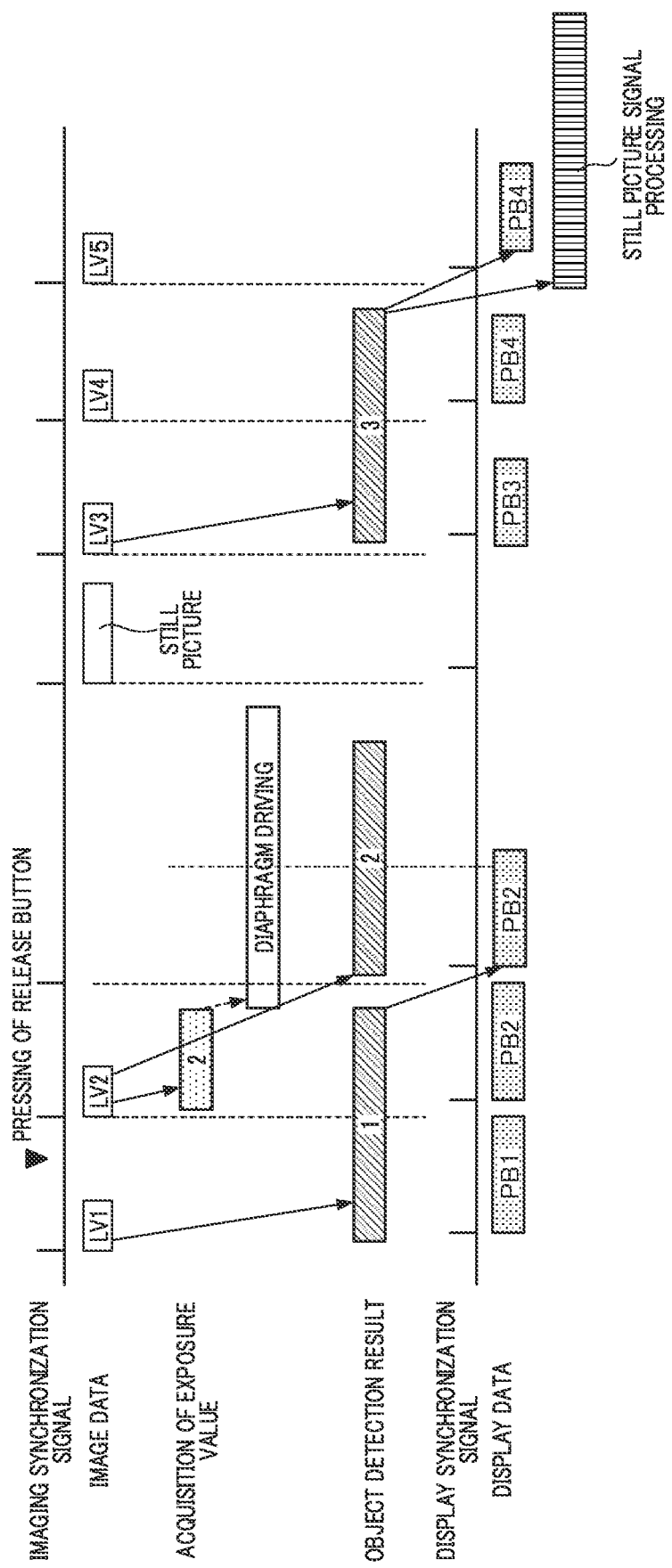
FIG. 5 is a timing chart illustrating another example in a case where a still picture is captured during high-speed LV in Embodiment 1 and a diaphragm is driven.

In FIG. 5, an object detection result in signal processing of a still picture is generated from image data LV3 for LV immediately after a still picture is captured, with respect to FIG. 4. A still image is temporarily stored in the image memory 112, and the still image is read from the image memory 112 at a timing when the object detection result is generated from LV3, and signal processing is performed (the horizontal axis represents time). In addition, exposure at the time of imaging of LV3 is set to be the same as exposure at the time of imaging of a still picture (exposure is not changed in at least the capture of a still picture and the imaging of LV3). That is, the state of the diaphragm (e.g. an aperture value) at the time of acquiring a still image and the state of the diaphragm (e.g. an aperture value) at the time of acquiring a predetermined image for live view again immediately after the acquisition of a still image are set to be the same as each other.

Figure 6:
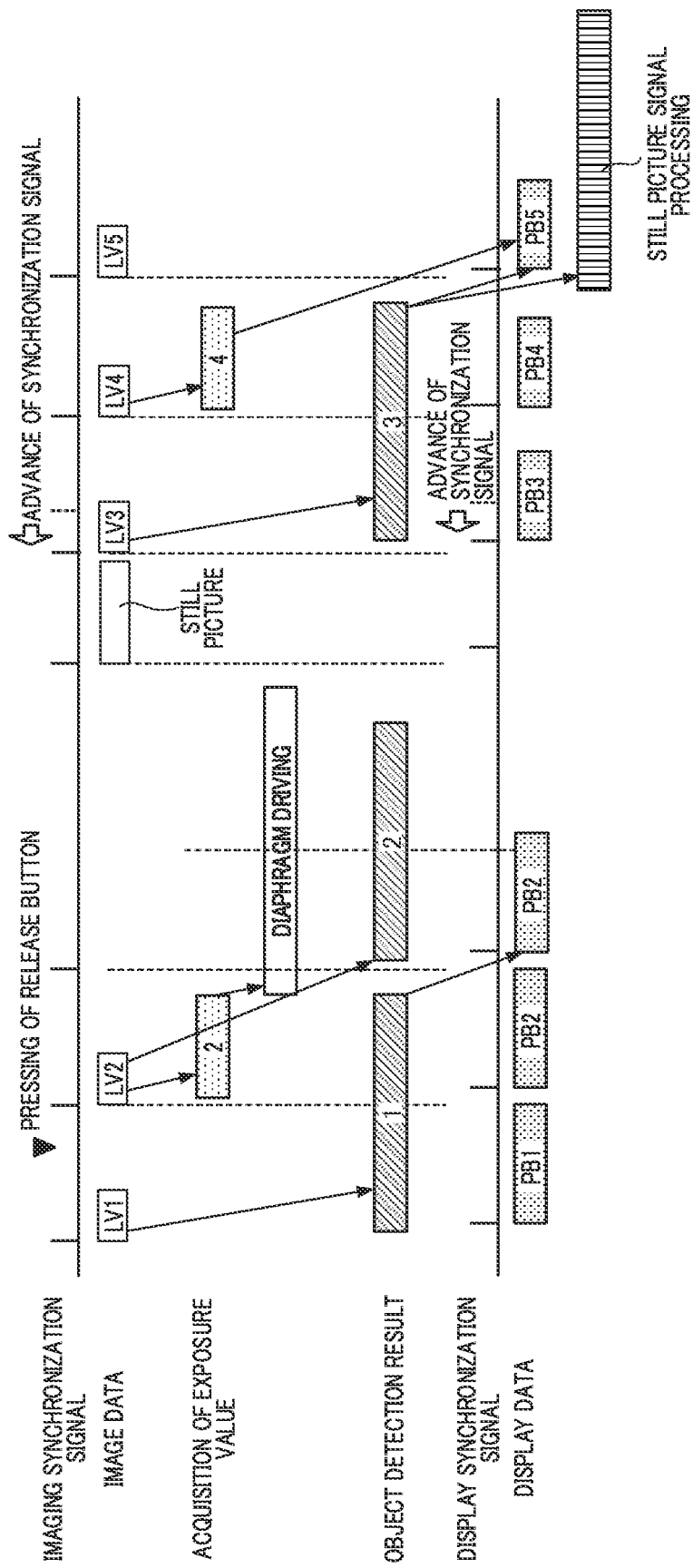
FIG. 6 is a timing chart illustrating still another example in a case where a still picture is captured during high-speed LV in Embodiment 1 and a diaphragm is driven.

Thus, the still image and the image of LV3 are less likely to cause object blur because an imaging interval is short. Further, since an exposure value at a point in time of LV3 and an exposure value of the still image are the same, the reliability of an object detection result based on the image obtained by LV3 is high. FIG. 6 is a timing chart illustrating still another example of a case where a still picture is captured during high-speed LV in Embodiment 1 and a diaphragm is driven.

In FIG. 6, after the capture of a still picture ends, the system control unit 109 temporally advances a synchronization signal for imaging and a synchronization signal for display as much as possible (the horizontal axis represents time). That is, when a predetermined image for live view is acquired again immediately after a still image is acquired, a synchronization signal for acquiring the predetermined image for live view is reset. That is, the synchronization signal for imaging and the synchronization signal for display are reset immediately after the capture of a still picture is completed. This is to minimize object deviation of an image by narrowing an interval between the capture of a still picture and the capture of LV3 as much as possible.

By performing such control, it is possible to appropriately perform signal processing of a still picture without obtaining detection results of an object from a still image while appropriately displaying an object frame of LV display even during high-speed imaging processing. Meanwhile, an exposure result obtained from LV2 and an exposure result obtained from LV4 are compared with each other, and it may be determined whether or not to reflect an object detection result obtained from LV3 in the display image PB5 in accordance with the comparison result (how much exposure fluctuation has occurred).

As described above, in the example illustrated in FIGS. 3 to 6, object information is detected from an image for live view obtained immediately before or immediately after a still image is acquired, and developing processing is performed on the still image on the basis of the detected object information. In addition, when an image for live view is processed, the image for live view is processed on the basis of object information detected from the image for live view, and a mark such as an object frame for tracking an object is displayed on a screen.

Figure 7:
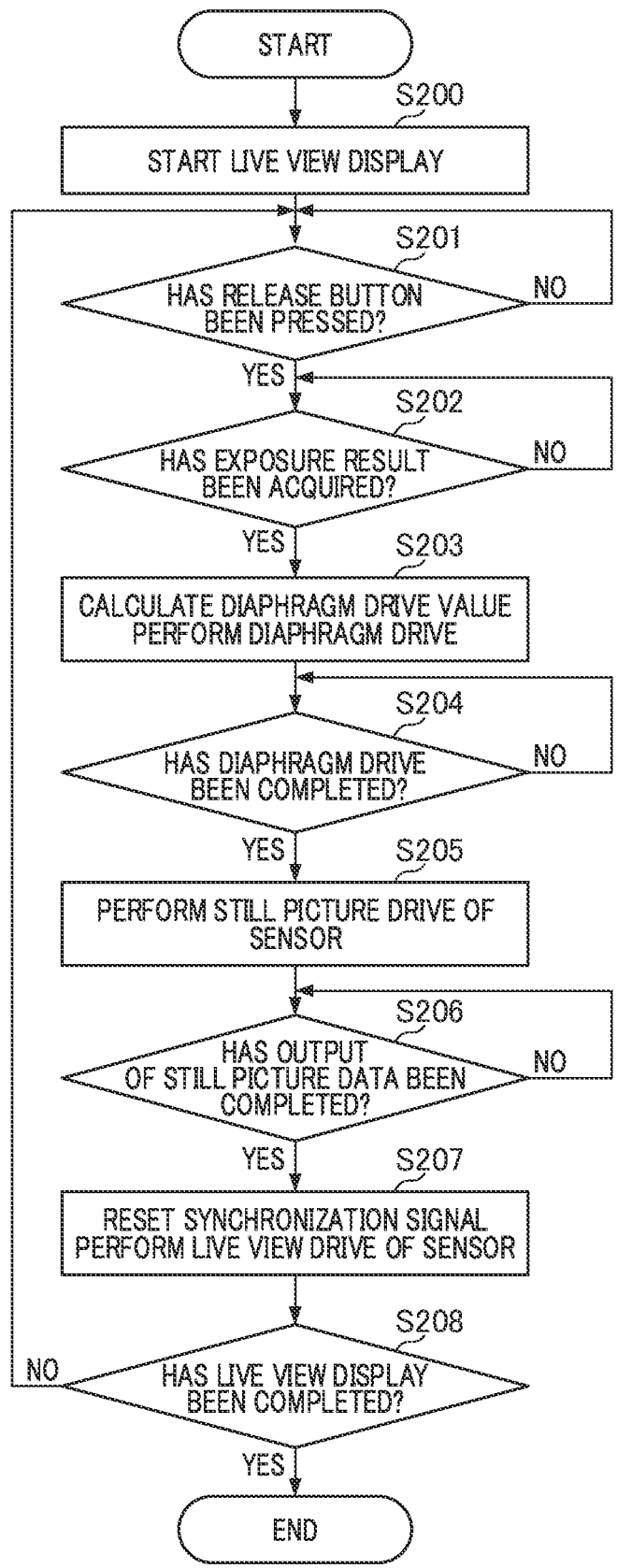
FIG. 7 is a flowchart illustrating an operation sequence in Embodiment 1.

FIG. 7 is a flowchart illustrating an operation sequence of the CPU 110 corresponding to the timing chart described in FIG. 6. In step S200 of FIG. 7, when the power of a camera is turned on, LV display is started. After the LV display is started, it is determined in step S201 whether or not a shutter release button has been pressed. In a case where it is determined that the shutter release button has been pressed, the exposure detection unit 111 detects exposure from an image for LV obtained immediately after the shutter release button is pressed in step S202, and the completion of acquisition of an exposure result is awaited.

When the exposure result is acquired, the processing proceeds to step S203, the CPU 110 calculates a diaphragm drive value, and the optical system drive unit 101 performs diaphragm drive through the system control unit 109. In step S204, the completion of the diaphragm drive is awaited. After the diaphragm drive is completed, the sensor drive unit 103 switches a drive mode of the sensor 102 to a still picture drive mode and performs switching to a synchronization signal for a still picture drive mode in step S205. In step S206, it is determined whether or not the output of data of a still image from the sensor 102 has been completed by confirming whether or not writing of the still image data in the image memory 112 has been completed.

When the output of the still picture data from the sensor 102 is completed, the processing proceeds to step S207, and the system control unit 109 resets a synchronization signal for display and a synchronization signal for the sensor and rapidly restarts imaging and display for LV with respect to the sensor drive unit 103. Here, steps S200 to S208 function as a drive control unit that acquires a still image through a predetermined operation and acquires an image for live view again immediately after a still image is acquired when an image for live view is periodically acquired at a first period.

Subsequently, when it is determined in step S208 that live view display has not been completed (the power of the camera is turned on, and the acquisition of a still picture is set to be in a waiting state), the processing returns to step S201. In addition, a flow of step S201 to step S208 is repeated. When it is determined in step S208 that LV display has been completed, the flow of FIG. 7 is ended. Meanwhile, an example in which object information used at the time of performing signal processing of a still picture is acquired from an LV image after a still picture is captured has been described above, but this is an example of a case where imaging for high-speed LV and the capture of a still picture through high-speed continuous shooting are performed.

That is, this is an example of a case where a still image is acquired through a predetermined operation when an image for live view is periodically acquired at a predetermined first period (high-speed). On the other hand, in a case where imaging for low-speed LV and the capture of a still picture through low-speed continuous shooting are performed, control is performed such that object information detected from a moving image and a still image is reflected in the moving image and the still image. That is, in a case where a still image is acquired through a predetermined operation when an image for live view is periodically acquired at a low speed (second period) slower than the first period, object information is detected from the still image to process the still image.

Embodiment 2

Embodiment 2 is characterized in that the accuracy of still picture development recorded is prioritized in a case where a still picture is captured during high-speed LV display, and an object is detected from an image captured for a still picture. Meanwhile, the same members as those in Embodiment 1 are denoted by the same reference numerals and signs, and the description thereof will be omitted.

Figure 8:
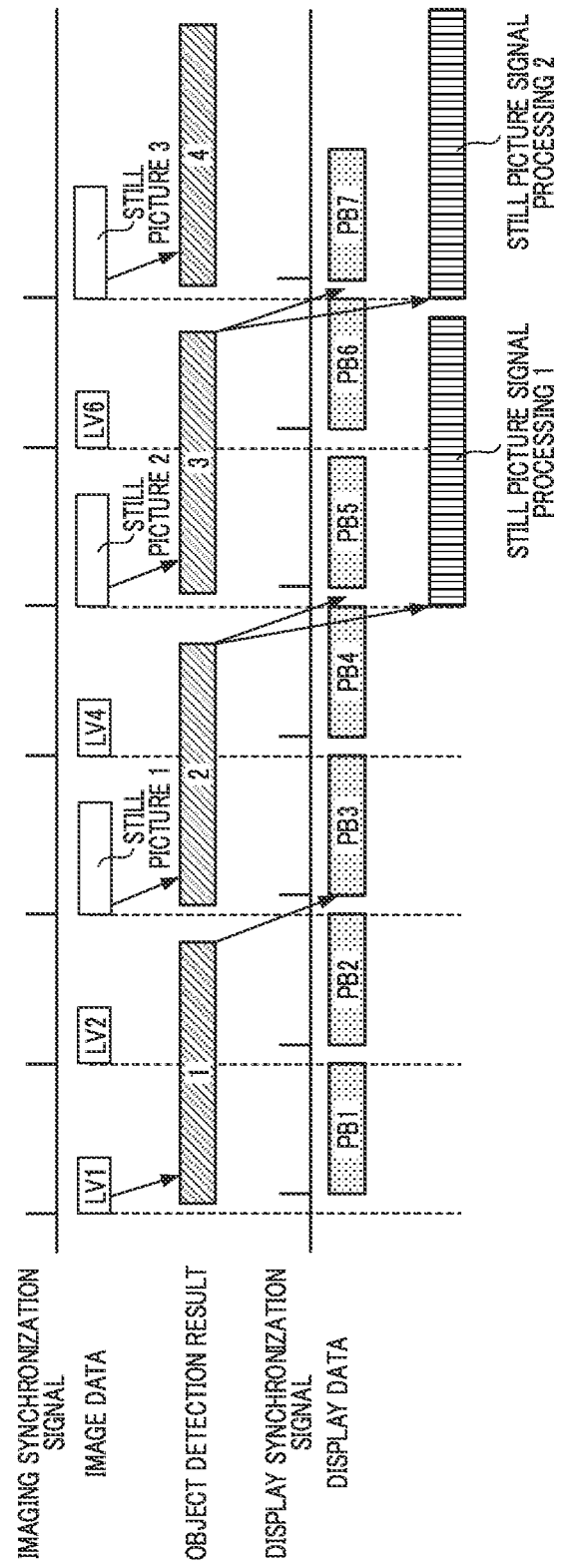
FIG. 8 is a timing chart in a case where a still picture is captured during high-speed LV display in Embodiment 2.

FIG. 8 is a timing chart in a case where a still picture is captured during high-speed LV display with respect to FIG. 2. An example in which the capture of a still picture is performed at positions denoted by LV3 and LV5 in FIG. 2 at a timing of LV7 not illustrated in FIG. 2 (a horizontal axis represents a time). In FIG. 2, the object position detection unit 107 detects an object from imaging data of LV3, and a detection result is reflected in a frame denoted by PB5.

On the other hand, since LV3, LV5, and LV7 are not present in FIG. 8, either detection of an object from a still picture or acquisition of an object from LV4 and LV6 is performed. In a case where an object is detected from images of LV4 and LV6, there is a time difference between the capture of a still picture and imaging for LV, and thus there is a possibility that the object will move. In a case where the object is moving, a deviation occurs in the position of the object shown in a still image and the position of the object detected from an image for LV, which makes it impossible to perform still picture development with high accuracy.

On the other hand, in a case where an object is detected from an image captured for a still picture, an object cannot be detected from an image captured for LV. Accordingly, there is a possibility that the tracking of an object will not be successful because it is not possible to perform object detection for object tracking. However, in the present Embodiment, an object is detected from an image captured for a still picture by prioritizing image quality for a still picture to be recorded, and the object detection result is reflected on still picture developing processing.

As described above, according to Embodiment 2, even when a still picture is captured during high-speed LV display, the image quality of the still picture to be recorded is prioritized. In addition, an object is detected from a still image captured for a still picture, and the result is reflected in developing processing of the still picture, thereby making it possible to prevent the image quality of the still picture to be recorded from deteriorating.

Embodiment 3

Figure 9:
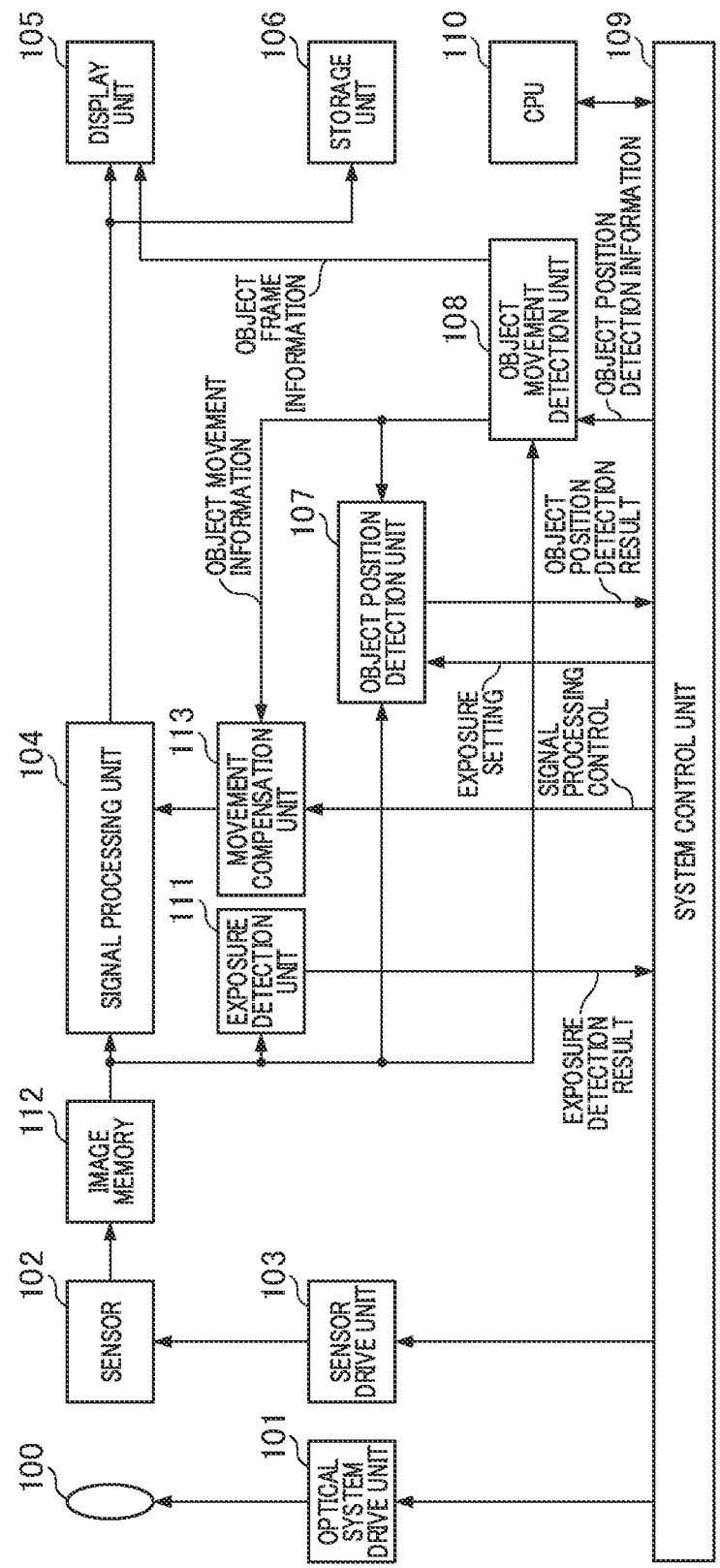
FIG. 9 is a block diagram of an image processing device in Embodiment 3.

Embodiment 3 is characterized in that an image from which an object is detected is switched in accordance with exposure setting to be applied to a still picture, and the like. Meanwhile, the same members as those in Embodiments 1 and 2 are denoted by the same reference numerals and signs, and the description thereof will be omitted. In FIG. 9, the object position detection unit 107 performs object detection by selecting whether to detect an object from a still image or acquire an object from an image for LV on the basis of exposure setting during the capture of a still picture, and the like.

In addition, 113 denotes a movement compensation unit, and the movement compensation unit compensates object positional information in signal processing. Specifically, in a case where an object is detected from an image for LV, there is a time difference between the capture of a still picture and the capture of an image for LV, and thus there is a possibility that the object will be moving. For this reason, the movement compensation unit 113 compensates the position of the object in the signal processing unit 104 on the basis of object movement information received from the object movement detection unit 108.

FIG. 10 is a flowchart illustrating an operation flow of the CPU 110 for the object position detection unit 107 which is a feature of Embodiment 3. In step S300 of FIG. 10, exposure control during imaging for LV and exposure control during the capture of a still picture are compared with each other on the basis of an exposure detection result obtained from the exposure detection unit 111 and a user's exposure setting. In addition, it is determined whether or not a difference in exposure between exposure control during imaging for LV and exposure control during the capture of a still picture is greater than a predetermined value.

In a case where it is determined in step S300 that the difference in exposure between exposure control during imaging for LV and exposure control during the capture of a still picture is not greater than the predetermined value, the processing proceeds to step S301. In step S301, it is less likely that tracking of an object will not be successful even when an object is detected from an image captured for a still picture, and thus object detection is performed on the basis of a still image. In step S300, in a case where the difference in exposure between exposure control during imaging for LV and exposure control during the capture of a still picture is equal to or greater than the predetermined value, it is highly likely that tracking of an object will not be successful when an object is detected from an image captured for a still picture. Thus, object tracking is prioritized, and the processing proceeds to step S302.

In step S302, it is determined whether or not the amount of movement of a main object is greater than a predetermined value on the basis of object movement information received from the object movement detection unit 108. When it is determined in step S302 that the amount of movement of the main object is not greater than the predetermined value, it is less likely that tracking will not be successful even when an object is detected from an image captured for a still picture, and thus the processing proceeds to step S303. In step S303, an object is detected from a still image. In step S302, when the amount of movement of the main object is greater than the predetermined value, it is highly likely that tracking will not be successful when an object is detected from an image captured for a still picture, and thus the processing proceeds to step S304.

In step S304, an object is detected from an image for LV. At that time, it is determined whether to detect an object from an image for LV captured immediately before a still picture is captured or whether to detect an object from an image for LV captured immediately after a still picture is captured, and thus an exposure center of each of the still picture and the images for LV is calculated. Here, the exposure center refers to the center of an exposure period (imaging period). This is because an object is less likely to move when an object is detected from either one of images for LV of which an exposure center is closer to a still picture (that is, of which an exposure timing is less different from an exposure timing of the still picture).

In a case where an exposure center of an image for LV captured immediately before a still picture is captured is close to an exposure center of the still picture than that of an image for LV captured immediately after a still picture is captured, the processing proceeds to step S305, and an object is detected from the image for LV captured immediately before the still picture is captured. On the other hand, in a case where an exposure center of an image for LV captured immediately after a still picture is captured is closer to the still picture than that of an image for LV captured immediately before a still picture is captured, the processing proceeds to step S306, and an object is detected from the image for LV captured immediately after the still picture is captured.

In step S307, in a case where an object is detected from an image for LV, there is a possibility that the object will be moving, and thus signal processing (developing processing) of a still picture is performed by inferring the position of the object at the timing of capturing of the still picture on the basis of object movement information received from the object movement detection unit 108. Here, step S307 functions as a compensation unit that compensates the movement of the object. As described above, according to the present Embodiment, object information is detected from at least one of the images for live view and the still image in accordance with predetermined conditions.

Further, an image for LV for detecting an object is selected in accordance with exposure control of an image for LV and a still picture and predetermined conditions such as the movement of the object. In this manner, it is possible to improve image quality of a still picture and improve the accuracy of object detection and the like by selecting at least one of images for LV immediately before a still image is captured, an image for LV immediately after the still image is captured, and the still image in accordance with predetermined conditions. Meanwhile, as the above-described predetermined conditions, object detection may be performed by, for example, comparing contrasts of respective objects of an image for LV immediately before a still image is captured, an image for LV immediately after the still image is captured, and the still image with each other and selecting, for example, an image having the highest contrast. Thereby, the reliability of object detection is improved.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Meanwhile, a computer program for realizing some or all of the controls in the present Embodiment and the functions of the above-described Embodiments may be supplied to an image processing device through a network or various storage mediums. In addition, a computer in the image processing device (or a CPU, an MPU, or the like) may read and execute programs. In this case, the programs and a storage medium storing the programs constitute the present disclosure.

This application claims the benefit of Japanese Patent Application No. 2019-232534 filed on Dec. 24, 2019, which is hereby incorporated by reference herein in its entirety.

What is claimed is:

1. An image processing device comprising:
at least one processor configured to function as:
an imaging unit which is capable of selectively acquiring an image for live view and a still image;
a drive control unit which acquires the still image through a predetermined operation when the image for live view is periodically acquired at a predetermined first period, and acquires an image for live view again immediately after the still image is acquired;

an object detecting unit which detects object information from an image for live view immediately before or the image for live view obtained immediately after the still image is acquired; and a signal processing unit which processes the still image on the basis of the object information detected by the object detecting unit, wherein, in a case where the still image is acquired through a predetermined operation when the image for live view is periodically acquired at a predetermined second period longer than the predetermined first period, the object detecting unit detects object information from the still image, and the signal processing unit processes the still image on the basis of the object information detected by the object detecting unit.

2. The image processing device according to claim 1, further comprising a display unit which displays an image obtained from the signal processing unit.

3. The image processing device according to claim 1, wherein the signal processing unit processes the image for live view on the basis of the object information detected from the image for live view.

4. The image processing device according to claim 3, wherein the signal processing unit processes the image for live view on the basis of the object information detected from the image for live view to display a mark for tracking an object.

5. The image processing device according to claim 1, wherein, in a case where the object detecting unit detects object information from the image for live view obtained immediately after the still image is acquired, the drive control unit resets a synchronization signal for acquiring a predetermined image for live view when the predetermined image for live view is acquired again immediately after the still image is acquired.

6. The image processing device according to claim 1, further comprising a diaphragm which controls light incident on the imaging unit when the still image is acquired, wherein, in a case where the object detecting unit detects object information from the image for live view obtained immediately after the still image is acquired, a state of the diaphragm when the still image is acquired is made consistent with a state of the diaphragm at the time of acquiring the predetermined image for live view again immediately after the still image is acquired.

7. An image processing method comprising the steps of:
selectively acquiring an image for live view and a still image;

performing drive controlling for acquiring the still image through a predetermined operation when the image for live view is periodically acquired at a predetermined first period, and acquiring an image for live view again immediately after the still image is acquired;

detecting object information from an image for live view immediately before or immediately after the still image is acquired; and processing the still image on the basis of the object information detected in the detecting of the object information, wherein, in a case where the still image is acquired through a predetermined operation when the image for live view is periodically acquired at a predetermined second period longer than the predetermined first period, the object information is detected from the still image, and the still image is processed on the basis of the object information detected.

8. A non-transitory computer-readable storage medium configured to store a computer program for an image processing device to execute the following steps:
selectively acquiring an image for live view and a still image;

performing drive controlling for acquiring the still image through a predetermined operation when the image for live view is periodically acquired at a predetermined first period, and acquiring an image for live view again immediately after the still image is acquired;

detecting object information from an image for live view immediately before or immediately after the still image is acquired; and processing the still image on the basis of the object information detected in the detecting of the object information, wherein, in a case where the still image is acquired through a predetermined operation when the image for live view is periodically acquired at a predetermined second period longer than the predetermined first period, the object information is detected from the still image, and the still image is processed on the basis of the object information detected.

\* \* \* \* \*